Dec. 8, 1942.      R. F. METZGER ET AL      2,304,504
DUAL LENS CONSTRUCTION
Filed May 9, 1940
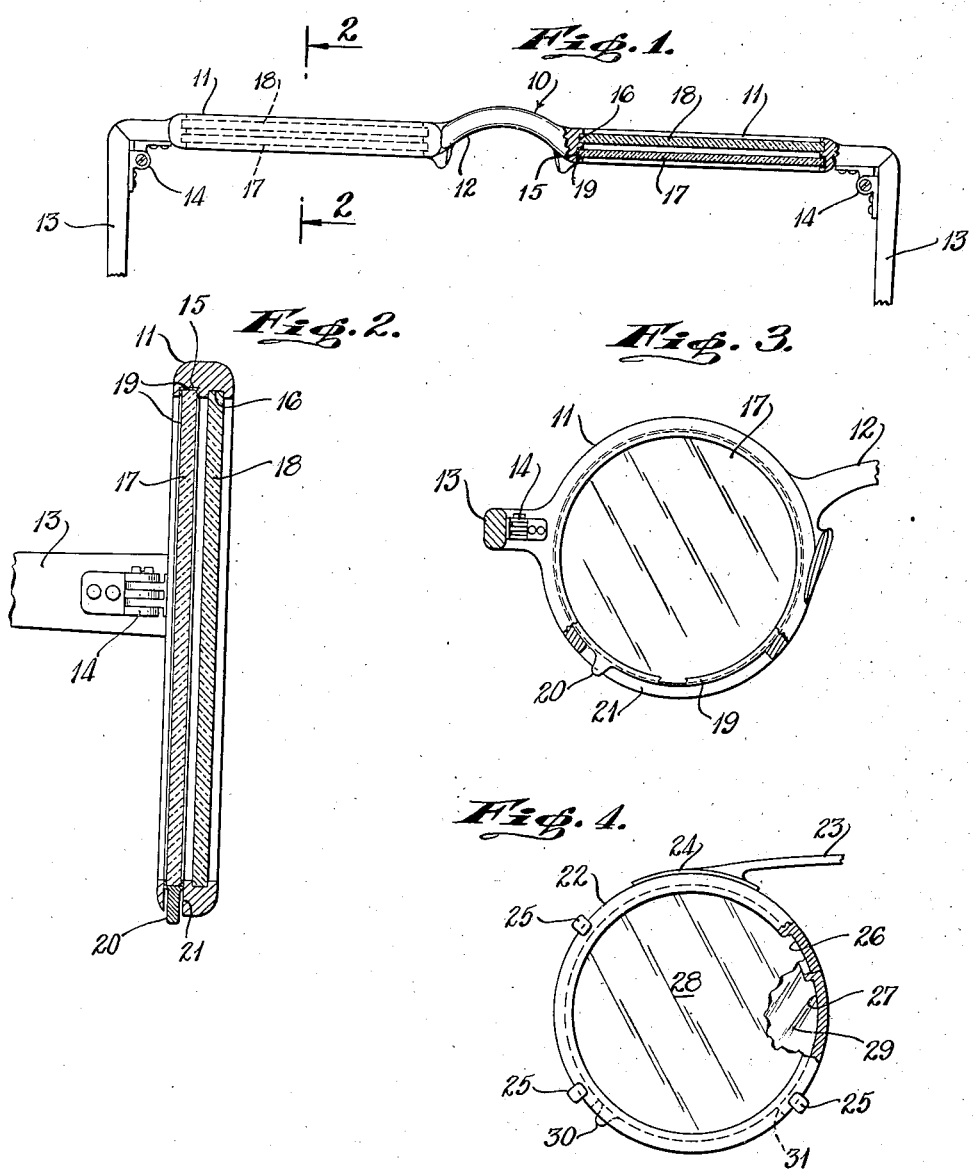
INVENTOR
REINHARDT F. METZGER
BY   MILTON F. METZGER
ATTORNEY Patented Dec. 8, 1942

2,304,504

UNITED STATES PATENT OFFICE 2,304,504

DUAL LENS CONSTRUCTION

Reinhardt F. Metzger, Glendale, and Milton F. Metzger, Forest Hills, N. Y.

Application May 9, 1940, Serial No. 334,106

3 Claims. (Cl. 88—41)

This invention relates to dual lens constructions wherein at least one of the dual lenses is rotatably adjustable with respect to the other, and the object of the invention is to provide a construction wherein rotary adjustment of one lens with respect to the other modifies the passage of light through the lenses in a predetermined manner, a further object being to provide a dual lens construction wherein both lenses are constructed in a manner to have light polarizing characteristics whereby rotary adjustment of one lens with respect to the other will vary the amount and quality of light passing through the lenses, a still further object being to provide means for supporting the two lenses of a dual construction in connection with one another and in connection with other various types of lenses or lens mountings, and with these and other objects in view, the invention consists in an article of the class and for the purpose specified which is constructed in accordance with the method more fully hereinafter described.

The invention is fully disclosed in the following specification, of which the accompanying drawing forms a part, in which the separate parts of our invention are designated by suitable reference characters in each of the views, and in which:

Fig. 1 is a plan view partially in section, illustrating one adaptation of our improved lens construction.

Fig. 2 is a section substantially on the line 2—2 of Fig. 1.

Fig. 3 is an elevation of a portion of the construction shown in Fig. 1 with part of the structure broken away; and Fig. 4 is a view similar to Fig. 3 showing a modification.

To illustrate one form of improved lens construction, there has been shown in Figs. 1 to 3 of the drawing, a frame 10 of the general shape and contour of a conventional spectacle frame, including two rim portions 11 connected by a suitable nose or bridge member 12, and having bows or temples 13 pivotally secured as at 14 to the extremities of the frame portions. It will be apparent that the shape and contour of the frame 10 are merely diagrammatic, and may be varied in much the same manner as in ordinary spectacle frames. The rim portions 11 are provided with inner and outer peripheral channels 15 and 16 to receive inner and outer lenses 17 and 18 respectively.

At least one of the lenses is mounted for rotary movement in the frame 11, and for purposes of illustration, the lens 17 has been indicated as a movable lens. A suitable reinforcing rim 19 is preferably employed to prevent damage to the lens and to form a support for an operating projection 20 which passes through an aperture 21 extending outwardly through the periphery of the frame 11. The projection 20 may be integral with the rim 19 or may be secured to the rim by welding or other suitable means. The lenses 17 and 18 will be characterized as to light transmitting properties so that rotation of the lens 17 with respect to the lens 18 will vary the transmission of light in a predetermined manner.

There are various ways in which the lenses may be characterized so that rotary movement of one lens with respect to the other will modify the transmission of light in one way or another. As an example of one form of characterization, the lenses 17 and 18 may be formed from or may include material having light polarizing properties. When two polarizing lenses are arranged as indicated in the drawing, and one rotated with respect to the other, it will be apparent that the transmission of light will be decreased as the planes or axes of polarization are moved from the parallel toward the right angle position one with respect to the other. Thus by mounting the two polarizing lenses together and providing means for rotating one of the lenses through an arc of approximately 90° as indicated in Fig. 3 of the drawing, it is possible to vary the transmission of ordinary visible light through the lenses between relatively wide limits. In fact when the planes or axes of polarization are substantially at right angles, the visibility through the lenses may be almost completely cut off.

The improved construction is especially advantageous for use in glasses to protect the eyes of an individual from the light of the sun or other bright and harmful sources, and it will be apparent that the adjustment provided makes it possible for an individual to vary the darkening or light-diminishing effect of the lenses to meet prevailing conditions. It will be understood that the movable lens will be supported in any desired position of adjustment by the frictional engagement between the lens or the reinforcing rim thereof and the mounting frame. If desired, however, suitable means may be provided for positively retaining the movable lens in different positions of adjustment.

In Fig. 4 of the drawing, there is shown part of a construction adapted for use in conjunction with ordinary spectacles. This modified construction includes a pair of rims 22, only one of which being shown in the drawing, joined by a resilient spring member 23 preferably secured to the upper periphery of the frames 22 as at 24. A plurality of protruding members 25 are provided at spaced intervals about the frame 22 extending from the rear or inner side of the frame in a manner to engage peripheral edges of a conventional eyeglass or spectacle frame. It will be noted that the members 25 which might be termed clip members are arranged so that the tension in the spring 23 will urge the clip members into firm engagement with a spectacle frame, and the two frames 22 will be held in what might be termed tong-like engagement with the spectacle frame. The frame 22 is provided with inner and outer annular channels 26 and 27 to receive inner and outer lenses 28 and 29 respectively. At least one of the lenses is provided with a protruding member 30 extending through an opening 31 in the groove engaging said lens, the opening 31 being sufficiently long to provide at least a 90° movement of the projecting member 30 about the periphery of the frame 22. The projecting member 30 will preferably be secured to a reinforcing rim similar to the rim 19 shown in Fig. 2 of the drawing.

It will be noted that while reference has been made to at least one of the lenses as being rotatably adjustable, in some uses and adaptations of the invention it may be desirable to provide rotary adjustment of both lenses, and it will be understood that the disclosure in Fig. 4 may be construed as indicating a construction wherein both lenses are adjustable. In normal uses of the dual lens construction, that is, in uses of the construction in variable light diminishing spectacles it will be apparent that the outer lens will normally be arranged or oriented to substantially cut out the glare of polarized light reflected from horizontal surfaces. Then by varying or adjusting the orientation of the inner lens there will be substantially uniform diminishing of the light transmitted through the lenses. In some instances, however, one encounters strong reflected light from vertical or other angularly arranged surfaces. This reflected light is partially polarized and it will be apparent that in some instances it may be highly desirable to diminish the reflected glare from such vertical or angularly arranged surfaces. By providing adjustment of both lenses in the manner previously described, it will be apparent that the outer lens may first be adjusted to cut out the reflected glare from any objectionable source and the inner lens may then be adjusted to vary the transmission of ordinary non-polarized light through the lenses. When providing for adjustment of both lenses it may in some instances be desirable to lengthen the openings such as 31 in the lens engaging grooves to permit a greater degree of angular adjustment of the lenses.

While the invention has been described essentially in connection with polarizing lenses and the provision for the dual mounting and adjustment thereof, it will be apparent that the construction is equally applicable for use with other types and kinds of lenses. The lenses may, for example, have physical properties affecting the visibility therethrough in a predetermined manner. Furthermore, the adjustment of one or both lenses will alter or modify the visibility through the lenses to produce a predetermined desired result.

It will be understood that it is within the scope of the inventoin to vary the structural arrangement of the rim supports and control means to most suitably adapt the improved construction to the many uses to which it is applicable.

Having fully described our invention, what we claim as new and desire to secure by Letters Patent is:

1. A dual lens construction of the class described comprising a pair of lenses having light varying properties, means supporting said lenses in substantially parallel planes, means providing rotary adjustment of at least one lens with respect to the other, the means for supporting said lenses comprising a spectacle frame having spaced lens engaging parts joined by a suitable nose bridge, each of said lens engaging parts having a pair of annular grooves to receive said lenses, one groove of each part registering with an elongated aperture extending through the periphery of said part, the corresponding lens having a protruding member extending through said aperture to facilitate rotary movement of said lens, and said aperture being of a length to provide movement of the lens by said member through an angle of approximately 90°.

2. A dual lens construction of the class described comprising a pair of lenses having light polarizing properties, means supporting said lenses in substantially parallel planes, means providing rotary adjustment of at least one lens with respect to the other, the means for supporting said lenses comprising a spectacle frame having spaced lens engaging parts joined by a suitable bridge, each of said lens engaging parts having a pair of annular grooves to receive said lenses, at least one of said annular grooves opening through the periphery of said part to receive a protruding member on the corresponding lens for controlling the rotary movement of said lens, and said last named lens having a peripheral band closely engaging the walls of said groove while providing for intentional rotary movement of said lens.

3. A dual lens construction of the class described comprising a pair of lenses having light polarizing properties, means supporting said lenses in substantially parallel planes, means providing rotary adjustment of at least one lens with respect to the other, the means for supporting said lenses comprising a spectacle frame having spaced lens engaging parts joined by a suitable bridge, each of said lens engaging parts having a pair of annular grooves to receive said lenses, at least one of said annular grooves opening through the periphery of said part to receive a protruding member on the corresponding lens for controlling the rotatry movement of said lens, said last named lens having a peripheral band closely engaging the walls of said groove while providing for initial rotary movement of said lens, said parts having protruding clamps adapted to engage peripheral edges of a conventional frame, and said bridge comprising a resilient member adapted to support said clamps in firm engagement with said spectacle frame.

REINHARDT F. METZGER.
MILTON F. METZGER.